Sept. 26, 1944.  R. L. JOHNSTON  2,359,118
GASKETED JOINT STRUCTURE
Filed June 4, 1942
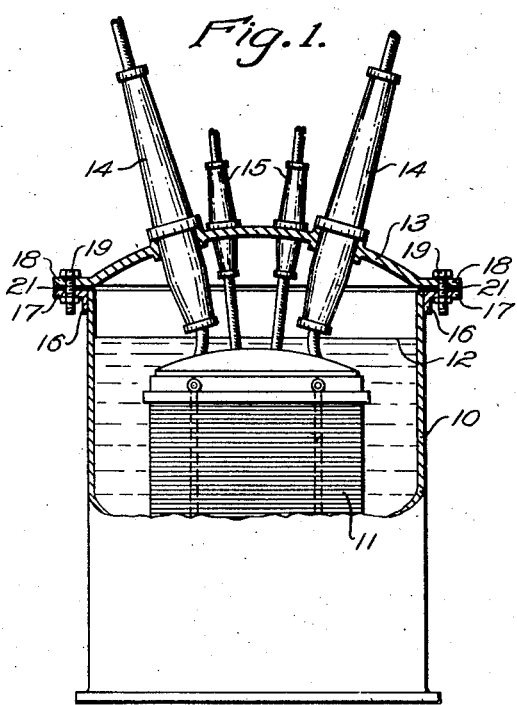
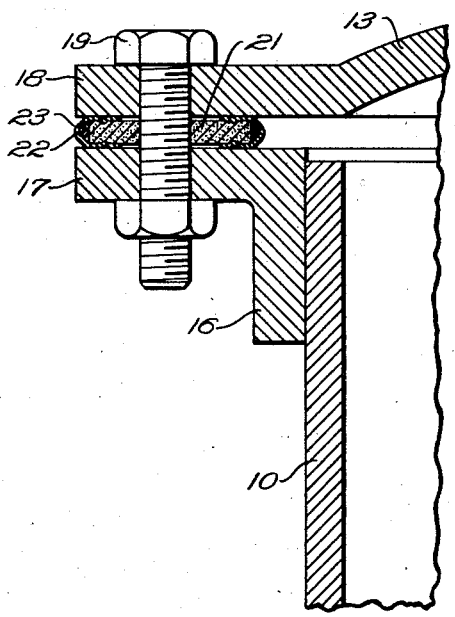
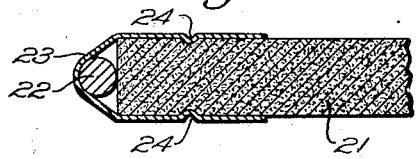
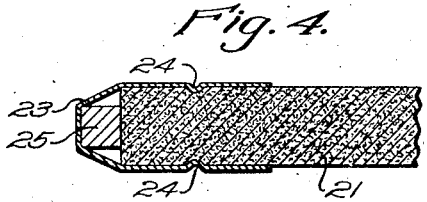
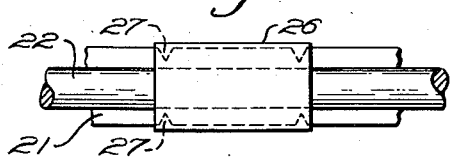
WITNESSES:
Robert C. Baird
N. C. Groome
INVENTOR
Robert L. Johnston.
BY
Franklin E. Hardy
ATTORNEY Patented Sept. 26, 1944

2,359,118

UNITED STATES PATENT OFFICE 2,359,118

GASKETED JOINT STRUCTURE

Robert L. Johnston, Sharon, Pa., assignor to Westinghouse Electric & Manufacturing Company, East Pittsburgh, Pa., a corporation of Pennsylvania Application June 4, 1942, Serial No. 445,749

2 Claims. (Cl. 288—26)

The invention relates to an oil or gas tight joint wherever desired, such as between the casing and cover of an electrical transformer or between different sections of the casing.

An object of the invention is the provision of a simple and efficient joint construction requiring no welding and adapted to provide a leak-proof joint by the use of a gasket between flat adjoining surfaces.

Another object of the invention is the provision of a gasket stop that is carried directly on the gasket itself to prevent forcing the adjoining surfaces on opposite sides of the gasket together sufficiently to injuriously crush the gasket.

Other objects and advantages of the invention will appear from the following description of preferred embodiments of the invention, reference being had to the accompanying drawing, in which:

Figure 1 is a view partly in elevation and partly in section showing an oil insulated transformer within a casing, the joints between the side wall portion of the case and the cover embodying the features of the invention, Fig. 2 is an enlarged sectional view of the joint shown in Fig. 1, Fig. 3 is an enlarged sectional view of a portion of the gasket shown in Fig. 2, Fig. 4 is an enlarged sectional view of a modified form of the gasket, Fig. 5 is an enlarged edge view of another modified form of the invention, and Fig. 6 is an enlarged sectional view of the structure shown in Fig. 5.

Referring to the drawing and particularly to Fig. 1 thereof, a transformer case 10 is shown in which is mounted a transformer core and coil assembly 11 immersed in an insulating liquid to the elevation 12. A casing cover 13 is provided for the casing upon which may be mounted high-voltage terminals 14 and low-voltage terminals 15 for accommodating the connection of the high-voltage and low-voltage circuits to the transformer windings in a well known manner. A flange member 16 is attached as by welding to the upper edge of the side wall of the casing 10 and is provided with an outwardly extending flange 17 having substantially the same outer and inner diameter as a flange 18 comprising a part of the cover 13. The two flanges 17 and 18 form adjacent flat ring surfaces which may be forced toward each other by a series of bolts 19 extending through openings in the flange portions to bring the adjacent flat surfaces thereof toward each other on the opposite side of a ring shaped gasket member 21 so as to form an oil-tight and gas-tight joint between the two flanges.

In order to prevent the gasket from being damaged by crushing upon the application of too great a force by the bolts 19, a stop 22 is shown which may be in the form of a round wire or rod extending about the periphery of the gasket and held adjacent the edge of the gasket by clips comprising thin strips of metal 23 which extend inwardly along the opposite sides of the gasket and are fastened thereto by crimped portions 24. A stop 22 may be provided adjacent both the inner and the outer edges of the annular ring like gasket member, or along either edge thereof alone, as desired. The strip of thin material 23 may be a single strip extending continuously along the edge of the gasket, or a number of separate metal clips evenly spaced along the edge.

Fig. 4 illustrates a stop member 25 which is shown as square in cross section instead of round, as is the stop 22 shown in Figs. 2 and 3. In Figs. 5 and 6, clips 26 are shown which differ from the clips 23 in that they are provided at their inner ends with prongs 27 extending into the opposite sides of the gasket for holding the clip to the gasket. The vertical dimension of the stop member 22 or 25 is considerably less than the vertical dimension of the gasket body member 21 when not under pressure, and the arrangement of the metal clips 23 or 26 is such that, as the gasket is compressed by drawing together the flanges 17 and 18, the metal clips 23 or 26 merely collapse or fold further around the stop member so as to readily maintain it in its desired position adjacent the edge of the gasket body member.

In the construction shown, it is unnecessary to provide a bead or stop welded to one of the flanges forming the joint, since each gasket will itself be provided with its own self-protecting stop along at least one of the edges of the gasket, and, if desired, along both edges to give firmer support between the two adjacent flanges.

Modifications in the specific structure illustrated and described will occur to those skilled in the art, and I do not wish to be limited otherwise than by the scope of the appended claims.

I claim as my invention:

1. A gasket comprising a body portion of compressible material having unreinforced surfaces adapted to engage cooperating rigid surfaces for forming a tight joint therebetween, stop means of substantially non-compressible material extending along the edge of the body portion of the gasket and having a thickness substantially less than the thickness of the gasket body when the gasket body is not under pressure between the rigid surfaces, and thin metal clips for fastening the stop to the edge of the gasket, said clips extending about the stop and the edge of the gasket and along the opposite sides of the gasket and provided with means for attaching the clips to the opposite sides of the gasket.

2. A gasket comprising an annular body portion of compressible material having surfaces adapted to engage cooperating rigid surfaces for forming a tight joint therebetween, and stop means of substantially non-compressible material extending along the inner and outer edges of the body portion of the gasket and having a thickness substantially less than the thickness of the gasket body when the gasket body is not under pressure between the rigid surfaces, and thin metal clips for fastening the stop means to the edge of the body portion of the gasket, said clips extending about the stop and the edge of the gasket and along the opposite sides of the gasket and provided with means for attaching the clips to the opposite sides of the gasket.

ROBERT L. JOHNSTON.